United States Patent [19]

Mazánek et al.

[11] 4,136,091

[45] Jan. 23, 1979

[54] PROCESS FOR THE PREPARATION OF POLYMERS CONTAINING AMINO GROUPS AND HYDROXYL AND/OR MERCAPTO GROUPS

[75] Inventors: Jan Mazánek; Johannes Blahak, both of Cologne, Germany

[73] Assignee: Bayer Aktiengesellschaft, Leverkusen, Germany

[21] Appl. No.: 824,460

[22] Filed: Aug. 15, 1977

[30] Foreign Application Priority Data

Jan. 19, 1977 [DE] Fed. Rep. of Germany ....... 2702050

[51] Int. Cl.² .................... C08L 75/00; C08G 18/00
[52] U.S. Cl. ................................ 260/455 R; 560/50; 528/292; 528/364

[58] Field of Search ................. 260/77.5 R, 77.5 CA, 260/455 R; 560/50

[56] References Cited

U.S. PATENT DOCUMENTS

| 3,808,250 | 4/1974 | Blahak et al. ............... 260/77.5 AM |
| 3,929,863 | 12/1975 | Blahak et al. ........................ 560/50 |

*Primary Examiner*—M. J. Welsh
*Attorney, Agent, or Firm*—Gene Harsh; Joseph C. Gil; R. Brent Olson

[57] ABSTRACT

The instant invention relates to compositions containing both amino groups and hydroxyl and/or mercapto groups. The products are obtained by reacting relatively high molecular weight polyols and/or polythiols with less than equivalent quantities of isatoic acid anhydride in two reaction stages.

4 Claims, No Drawings

PROCESS FOR THE PREPARATION OF POLYMERS CONTAINING AMINO GROUPS AND HYDROXYL AND/OR MERCAPTO GROUPS

BACKGROUND OF THE INVENTION

U.S. application Ser. No. 793,233, filed May 2, 1977, relates to polymers which contain both amino groups and hydroxyl and/or mercapto groups and which are obtained by the reaction of relatively high molecular weight polyols and/or polythiols with less than the equivalent quantity of isatoic acid anhydride.

It has been found that when nucleophilic reagents are reacted with isatoic anhydride (R. P. Steiger, E. M. Miller, J. Org. Chem. 24, 1214 (1953); ibid, 18, 1427 (1953)), the reaction may proceed along two lines:

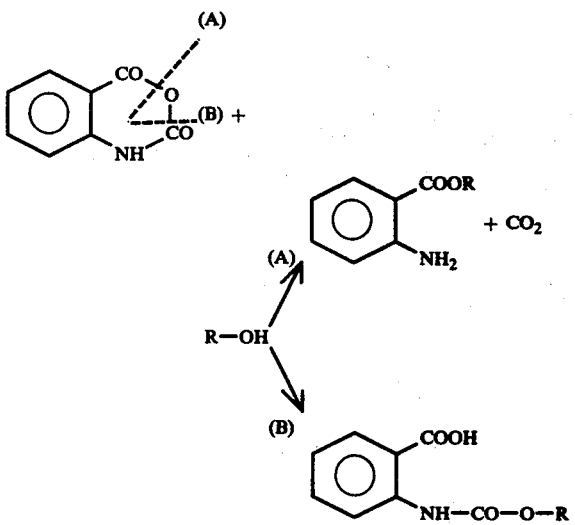

Thus, for example, when the reaction is carried out using aliphatic hydroxyl compounds, the reaction path along (A) leads to an anthranilic acid derivative and along (B) to a urethane-o-benzoic acid. The ratios in which the two reaction products are obtained depend to a great extent on the reaction conditions, particularly on the nature of the nucleophilic reagent, the catalyst, the reaction temperature, and the like.

The presence of free carboxyl groups in the products of the process often interferes severely with the quality of the polymers subsequently produced from these product mixtures by further reactions. Apart from any side reactions which the carboxyl groups may undergo, such as the reaction with isocyanates, the carboxyl groups have the effect of substantially reducing the resistance of the polymers to hydrolysis. It is therefore desirable to keep the number of carboxyl groups in the reaction products of polyols or polythiols and isatoic acid anhydride as low as possible.

In U.S. Pat. No. 3,808,250, a process is described wherein compounds containing OH and/or SH groups and having molecular weights of from 600 to 10,000 are reacted with substantially equivalent quantities of isatoic acid anhydride in the presence of a base. It was found, however, that in this process, the proportion of reaction mixture undergoing the above-described side reaction (B) is relatively high. As may be seen from the following Table 1, the reaction of polyethers with equivalent quantities of isatoic acid anhydride at about 110° C. in the presence of various catalysts yields products, in which the proportion of amine groups to acid groups (hereinafter referred to as A/S ratio) is in no case higher than 8:1.

Table 1

| Polyether | Catalyst | A/S Ratio |
|---|---|---|
| linear copolymer of propylene oxide and ethylene oxide; OH number 56, primary OH groups | permethylated diethylene triamine | 8 : 1 |
| copolymer of propylene oxide and ethylene oxide; OH number 56, trifunctional, primary OH groups | permethylated diethylene triamine | 8 : 1 |
| copolymer of propylene oxide and ethylene oxide; OH number 41; trifunctional, secondary OH groups | dimethylbenzylamine/tetra-methylguanidine (10 : 1) | 3 : 1 |
| polypropylene oxide started on trimethylol propane; OH number 870 | dimethylbenzylamine/tetra-methylguanidine (10 : 1) | 5 : 1 |
| mixture of linear polypropylene oxide (OH number 56), triethanolamine and N-methyl-diethanolamine (100 : 4 : 6 parts, by weight) | — | 5 : 1 |

In U.S. Pat. No. 3,929,863, a process is described wherein compounds containing OH and/or SH groups and having molecular weights of from 76 to 599 are reacted with from about 0.8 to 1.2 equivalents of isatoic acid anhydride in the presence of a base. Because of their relatively low molecular weight, the compounds described therein are excellent chain extenders for polyurethane resins.

It was surprisingly found in Ser. No. 793,233, that side reaction (B) described above was substantially suppressed if polyols or polythiols were reacted with a quantity of isatoic acid anhydride which is substantially smaller than the total quantity of hydroxyl and/or mercapto groups, optionally in the presence of organic or inorganic catalysts. The result was that the products obtained had a much smaller absolute quantity of carboxyl groups for a given proportion of amino groups (i.e. the A/S ratio is substantially higher) than in the modified polyethers prepared according to U.S. Pat. No. 3,808,250. It was also surprisingly found that if the products, which were partially "masked" polyols and contained free hydroxyl or mercapto groups in addition to amino groups, were used as starting components for the production of polyurethanes, the plastics products obtained have significantly better mechanical properties than those obtained from the products described in U.S. Pat. No. 3,808,250.

DESCRIPTION OF THE INVENTION

It has now been found that the A/S ratio defined above may be further increased by a substantial amount if the reaction between isatoic acid anhydride and polyol or polythiol is carried out in two stages. In the first stage, polyols and/or polythiols are reacted with from 5 to 90%, preferably from 5 to 70%, and most preferably from 10 to 40%, of the equivalent quantity (based on the total quantity of hydroxyl and/or mercapto groups) of isatoic acid anhydride in the presence of basic organic and/or inorganic catalysts at temperatures of from 20° to 130° C. The reaction may be carried out in the presence of an inert solvent if desired. When evolution of carbon dioxide has ceased, the reaction mixture is heated to from 140° to 240° C. (optionally under nitrogen) for a period of from 30 minutes to 10 hours, preferably from 1 to 5 hours. The temperature employed in the second stage of the process according to the present invention is chosen according to the boiling point of the basic catalyst used. If relatively volatile organic bases are used as catalysts, temperatures of from about 140° to 270° C. are suitably employed (and the reaction mixture should be heated for a correspondingly longer time) whereas in the presence of inorganic bases the mixture may be heated to about 200° C. or more and the phase of after-reaction may be kept relatively brief.

The present invention thus relates to a process for the preparation of compounds corresponding to the following general formula:

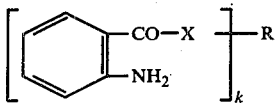

wherein

X represents oxygen or sulphur;

R represents a k-valent radical obtained by the removal of k hydroxyl and/or mercapto groups from an active hydrogen containing material selected from the group consisting of polyether polyols, polythioether polythiols, polyols containing both polyether and polythioether segments, and polythiols containing both polyether and polythioether segments, said material having n hydroxyl and/or mercapto groups and having a molecular weight of from 1,300 to 60,000;

n represents an integer of from 2 to 8; and k has an average value of from 0.05 n to 0.9 n, and preferably from 0.1 n to 0.4 n;

characterized in that in a first stage, said active hydrogen containing materials are reacted with from 5 to 90%, preferably from 5 to 70%, of the equivalent quantity (based on the total quantity of hydroxyl and/or mercapto groups) of isatoic acid anhydride in the presence of basic organic and/or inorganic catalysts at temperatures of from 20° to 130° C. and, after evolution of carbon dioxide has ceased, the reaction mixture is heated, in a second stage, to a temperature of from 140° to 240° C. for a period of from 30 minutes to 10 hours, optionally under nitrogen.

The basic catalysts useable according to the instant invention, which may be used, in quantities varying within wide limits include N,N-dimethylbenzylamine, N,N,N',N'-tetramethyl-guanidine, permethylated diethylene triamine, permethylated N-(2-aminoethyl)-piperazine, N,N'-endoethylene-piperazine, sodium hydroxide, potassium hydroxide and calcium hydroxide.

The polyether or polythioether polyols used as reactants for preparation of the products according to the present invention may be polyether polyols, polythioether polythiols or polyols or polythiols containing both polyether and polythioether segments which have molecular weights of from 1,300 to 60,000 and preferably from 1,500 to 6,000.

It is preferred to use polyether polyols which are free from sulphur, and in particular polymers of ethylene oxide, propylene oxide or tetrahydrofuran or polyether polyols which contain ethylene oxide, propylene oxide and butylene glycol-(1,4) units in any sequence. Polyether polyols of this type may be obtained by known methods. For example polyalkylene polyethers may advantageously be prepared by polymerization (for example catalyzed by $BF_3$) of the corresponding alkylene oxides, e.g. ethylene oxide or propylene oxide, in the presence of suitable starter molecules, such as water, low molecular weight polyols or low molecular weight amines which have at least two nitrogen-hydrogen bonds. Low molecular weight polyols suitable for use as starter molecules include, ethylene glycol, propane-1,2-diol, tetramethylene diol, hexamethylene diol, glycerol, trimethylolpropane, pentaerythritol, sucrose, and the like. The starter molecules preferably used for the process according to the present invention are difunctional or trifunctional polyethers which may be obtained, by reaction of the alkylene oxides with divalent or trivalent representatives of the low molecular weight polyols mentioned above. Suitable starter molecules also include ammonia and low molecular weight amines having at least two nitrogen-hydrogen bonds, such as, methylamine, butylamine, aniline, diaminobenzene, diaminotoluene, and the like. Polyols containing nitrogen are also advantageously used as starters. Particularly useful are triethanolamine and N-methyldiethanolamine.

When such polyethers containing nitrogen are reacted with isatoic acid anhydride, it is generally unnecessary to use catalysts. Suitable polythioethers and polythio-mixed ethers include, in particular, the condensation products obtained by reacting thiodiglycol on its own or with the abovementioned polyols.

According to the present invention, it is particularly preferred to modify sulphur-free trifunctional polyethers with isatoic acid anhydride.

According to the present invention, modification of the polyethers and/or polythioethers may also be carried out using a certain proportion (from 0 to 90, by weight, preferably from 0 to 60%, by weight, based on the total quantity of polyhydroxyl compounds) of low molecular weight polyhydroxyl compounds (molecular weight less than 1,300). Both low molecular weight polyethers and the polyols mentioned above as starter molecules may be used for this purpose. The compounds preferably used are again compounds, such as triethanolamine and N-methyl-diethanolamine or their ethoxylation or propoxylation products because they function as catalysts at the same time.

The solvents used for the reaction or when working up the reaction product may be any non-reactive solvents suitable for dissolving the starting materials and end products. The following are examples: methylene chloride, trichloroethylene, tetrahydrofuran, dioxane, methyl ethyl ketone, methyl isobutyl ketone, ethyl acetate and isobutyl acetate.

Although the invention has been described in detail for the purpose of illustration, it is to be understood that such detail is solely for that purpose and that variations can be made therein by those skilled in the art without departing from the spirit and scope of the invention except as it may be limited by the claims.

EXAMPLES

EXAMPLE 1

1,000 g of a copolymer of propylene oxide and ethylene oxide (OH number 56; primary OH groups) which was started on trimethylolpropane were dehydrated for 30 minutes at 120° C./15 Torr. After the copolymer had cooled to 30° C., 54.4 g of isatoic acid anhydride and 15 g of permethylated diethylene triamine were added (equivalent ratio of hydroxyl groups: isatoic acid anhydride = 3:1). The resulting suspension was heated to 110° C. with vigorous stirring and the temperature was maintained constant until evolution of carbon dioxide ceased. Thereafter, the reaction mixture was stirred at 165° C. for 8 hours. It was then cooled to 20° C., degasified under vacuum at a bath temperature of 20° C. for 30 minutes and filtered. The yield of partially blocked polyether was virtually quantitative.

Analysis of the reaction product:
$NH_2$: 0.61 milliequivalents/2 g
COOH: 0.022 milliequivalents/2 g
A/S ratio: 28:1.

EXAMPLE 2

The experiment was carried out as described in Example 1, but using a mixture of 400 g of a copolymer of propylene oxide and ethylene oxide (OH number 41; secondary OH groups) which had been started on trimethylolpropane and 600 g of an ethoxylated trimethylolpropane (OH number 870) and 784 g of isatoic acid anhydride, 30 g of dimethyl benzylamine and 5 g of tetramethylguanidine (ratio of hydroxyl groups : isatoic acid anhydride = 2:1). In the second stage of the reaction, the reaction mixture was stirred for 6 hours at 150° C. Subsequent working-up of the reaction mixture was carried out as described in Example 1. The yield was virtually quantitative.

$NH_2$: 5.03 milliequivalents/2 g
COOH: 0.21 milliequivalents/2 g
A/S ratio: 24:1.

EXAMPLE 3

The first reaction stage was carried out in the same way as described in Example 1, but using 1,000 g of a copolymer of propylene oxide and ethylene oxide (OH number 41; secondary OH groups) which had been started on trimethylolpropane, 59.8 g of isatoic acid anhydride and 3.9 g of sodium hydroxide (ratio of hydroxyl groups: isatoic acid anhydride = 2:1). When evolution of carbon dioxide had ceased, the reaction mixture was stirred at 150° C. for 6 hours. It was then cooled, diluted with 3 liters of methylene chloride and filtered. 4 liters of water were added and carbon dioxide was introduced for 15 minutes. The organic phase was separated and washed three times with water and the solvent was removed under vacuum.

Yield: 983 g (94.5% of the theoretical yield)
$NH_2$: 0.67 milliequivalents/2 g
COOH: 0.009 milliequivalents/2 g
A/S ratio: 74:1.

EXAMPLE 4

Example 3 was repeated, but in this case, the reaction mixture was stirred for 2 hours at 200° C. in the second reaction phase.

Yield: 980 g (94.2% of the theoretical yield)
$NH_2$: 0.66 milliequivalent/2 g
COOH: 0.006 milliequivalents/2 g
A/S ratio: 110:1.

What is claimed is:

1. A process for the preparation of compounds corresponding to the following general formula:

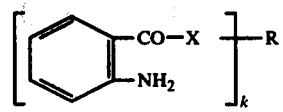

wherein
X represents oxygen or sulphur;
R represents a k-valent radical obtained by removal of k hydroxyl and/or mercapto groups from an active hydrogen containing material selected from the group consisting of polyether polyols, polythioether polythiols, polyols containing both polyether and polythioether segments, and polythiols containing both polyether and polythioether segments, said material having n hydroxyl and/or mercapto groups and having a molecular weight of from 1,300 to 60,000;
n represents an integer of from 2 to 8; and
k has an average value of from 0.05 n to 0.9 n,
characterized in that said active hydrogen containing materials are reacted with from 5 to 90% of the equivalent quantity (based on the total quantity of hydroxyl and/or mercapto groups) of isatoic acid anhydride in the presence of basic organic and/or inorganic catalysts at temperatures of from 20° to 130° C. in a first reaction stage and, when evolution of carbon dioxide has ceased, the reaction mixture is maintained, in a second reaction stage, at a temperature of from 140° to 240° C. for a period of from 30 minutes to 10 hours, optionally under nitrogen.

2. The process of claim 1 wherein said active hydrogen containing materials are reacted with from 5 to 70% of the equivalent quantity of isatoic acid anhydride in said first stages.

3. The process of claim 2 wherein said active hydrogen containing materials are reacted with from 10 to 40% of the equivalent quantity of isatoic acid anhydride in said first stages.

4. The process of claim 1, wherein the time in said second stage is from 1 to 5 hours.

* * * * *